United States Patent
Claywell et al.

(10) Patent No.: US 9,908,531 B1
(45) Date of Patent: Mar. 6, 2018

(54) METHOD AND APPARATUS FOR DETECTING SIZE OF PERSON PRIOR TO ENTERING A SPACE

(71) Applicant: GM GLOBAL TECHNOLOGY OPERATIONS LLC, Detroit, MI (US)

(72) Inventors: Mark R. Claywell, Birmingham, MI (US); Maqsood Rizwan Ali Khan, Rochester Hills, MI (US); Pulasti Bandara, Clinton Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/259,402

(22) Filed: Sep. 8, 2016

(51) Int. Cl.
*B60W 40/08* (2012.01)
*B60W 10/30* (2006.01)
*B60R 1/00* (2006.01)

(52) U.S. Cl.
CPC ............ *B60W 40/08* (2013.01); *B60W 10/30* (2013.01); *B60R 1/00* (2013.01); *B60W 2040/0872* (2013.01)

(58) Field of Classification Search
CPC ................ B60W 40/08; B60W 10/30; B60W 2040/0872; B60R 1/00
See application file for complete search history.

(56) References Cited

U.S. PATENT DOCUMENTS

| | | | |
|---|---|---|---|
| 2005/0131607 A1* | 6/2005 | Breed | B60N 2/002 701/45 |
| 2010/0121536 A1* | 5/2010 | Wang | B60R 21/01 701/45 |
| 2013/0218420 A1* | 8/2013 | Jendritza | B60N 2/002 701/49 |
| 2017/0169612 A1* | 6/2017 | Cashen | G06T 19/006 |

* cited by examiner

*Primary Examiner* — Rodney A Butler

(57) ABSTRACT

A method and apparatus for detecting a size of a person at an exterior of the space to be occupied are provided. The method includes: detecting, at an exterior of a vehicle, a size of a person approaching the vehicle to enter the vehicle; and adjusting a position of at least one from among a vehicle control, a vehicle mirror, and a vehicle seat based on the detected size of the person approaching the vehicle. The method and apparatus may be used to detect the size of a person intending to occupy a vehicle and to adjust positioning of various elements and controls based on the detected size prior to entering the vehicle.

16 Claims, 3 Drawing Sheets

METHOD AND APPARATUS FOR DETECTING SIZE OF PERSON PRIOR TO ENTERING A SPACE

Apparatuses and methods consistent with exemplary embodiments relate to detecting a size of a person or an object. More particularly, apparatuses and methods consistent with exemplary embodiments relate to detecting a size of a person and adjusting functions, controls and seats based on the detected size.

SUMMARY

One or more exemplary embodiments provide a method and an apparatus that detect a size of a person or object prior to entering a vehicle or space at the exterior of the vehicle or space. More particularly, one or more exemplary embodiments provide a method and an apparatus that detect a size of a person or an object at an exterior of the vehicle or space and that control to adjust controls, elements and seating in the vehicle or space based on the detected size.

According to an aspect of an exemplary embodiment, a method for detecting a size of a person outside of a vehicle is provided. The method includes: detecting, at an exterior of a vehicle, a size of a person approaching the vehicle to enter the vehicle; and adjusting a position of at least one from among a vehicle control, a vehicle mirror, and a vehicle seat based on the detected size of the person approaching the vehicle.

The detected size may include a height, and the detecting the size of the person may include determining a difference between the height of the person and a reference position, and summing the difference and a reference value of the reference position to detect the height of the person.

The detecting the size of the person may include detecting the size of the person in response to detecting that at least one foot of the person is touching ground.

The method may include determining whether the person approaching the vehicle intends to enter the vehicle based on a trajectory of a movement of the person. The detecting the size of the person may be performed in response to determining that the person approaching the vehicle intends to enter the vehicle.

The adjusting the position may include adjusting at least one from among an angle of a rearview mirror, an angle of a side view mirror, and height of a steering wheel, based on the detected size of the person approaching the vehicle.

The detecting, at the exterior of the vehicle, the size of the person approaching the vehicle to enter the vehicle may include receiving an input of a size of the person from the person approaching the vehicle.

The adjusting the position may include adjusting at least one from among a seat track position, a height of a seat, and a tilt of a seat back, based on the detected size of the person approaching the vehicle.

The detecting the size of the person approaching the vehicle may be performed based on information received from a sensor sensing the exterior of the vehicle. The sensor may include a plurality of cameras.

The person approaching the vehicle may include a plurality of people including a front seat occupant and a rear seat occupant, and the adjusting the position may include adjusting the position of a front seat based on the detected size of the front seat occupant and the detected size of the rear seat occupant.

According to an aspect of an exemplary embodiment, an apparatus for detecting size of a person approaching a vehicle is provided. The apparatus includes: at least one memory comprising computer executable instructions; and at least one processor configured to read and execute the computer executable instructions. The computer executable instructions cause the at least one processor to: detect, at an exterior of a vehicle, a size of a person approaching the vehicle to enter the vehicle; and adjust a position of at least one from among a vehicle control, a vehicle mirror, and a vehicle seat based on the detected size of the person approaching the vehicle.

The detected size may include a height, and the computer executable instructions may further cause the at least one processor to detect the height of the person by determining a difference between the detected height of the person and a reference position and sum the difference and a reference value of the reference position to detect the height of the person.

The computer executable instructions may further cause the at least one processor to detect the size of the person in response to detecting that at least one foot of the person is touching ground.

The computer executable instructions may further cause the at least one processor to determine whether the person approaching the vehicle intends to enter the vehicle based on a trajectory of a movement of the person, and the computer executable instructions may further cause the at least one processor to detect the size of the person in response to determining that the person approaching the vehicle intends to enter the vehicle.

The computer executable instructions may further cause the at least one processor to adjust the position by adjusting at least one from among an angle of a rearview mirror, an angle of a side view mirror, and height of a steering wheel, based on the detected size of the person approaching the vehicle.

The computer executable instructions may further cause the at least one processor to detect, at the exterior of the vehicle, the size of the person approaching the vehicle to enter the vehicle by receiving an input of a size of the person from the person approaching the vehicle.

The computer executable instructions may further cause the at least one processor to adjust the position by adjusting at least one from among a seat track position, a height of a seat, and a tilt of a seat back, based on the detected size of the person approaching the vehicle.

The computer executable instructions may further cause the at least one processor to detect the size of the person approaching the vehicle based on information received from a sensor sensing the exterior of the vehicle.

The sensor may include a plurality of cameras.

According to an aspect of another exemplary embodiment, a non-transitory computer readable medium is provided. The non-transitory computer readable medium includes computer executable instructions executable by a processor to perform the method for detecting a size of an object approaching a space. The method includes: detecting, at an exterior of a space, a size of an object approaching the space to enter the space; and adjusting a position of at least one from among a control, a mirror, a sensor, and a seat based on the detected size of the object approaching the space.

Other objects, advantages and novel features of the exemplary embodiments will become more apparent from the following detailed description of exemplary embodiments and the accompanying drawings.

DETAILED DESCRIPTION

Figure 1:
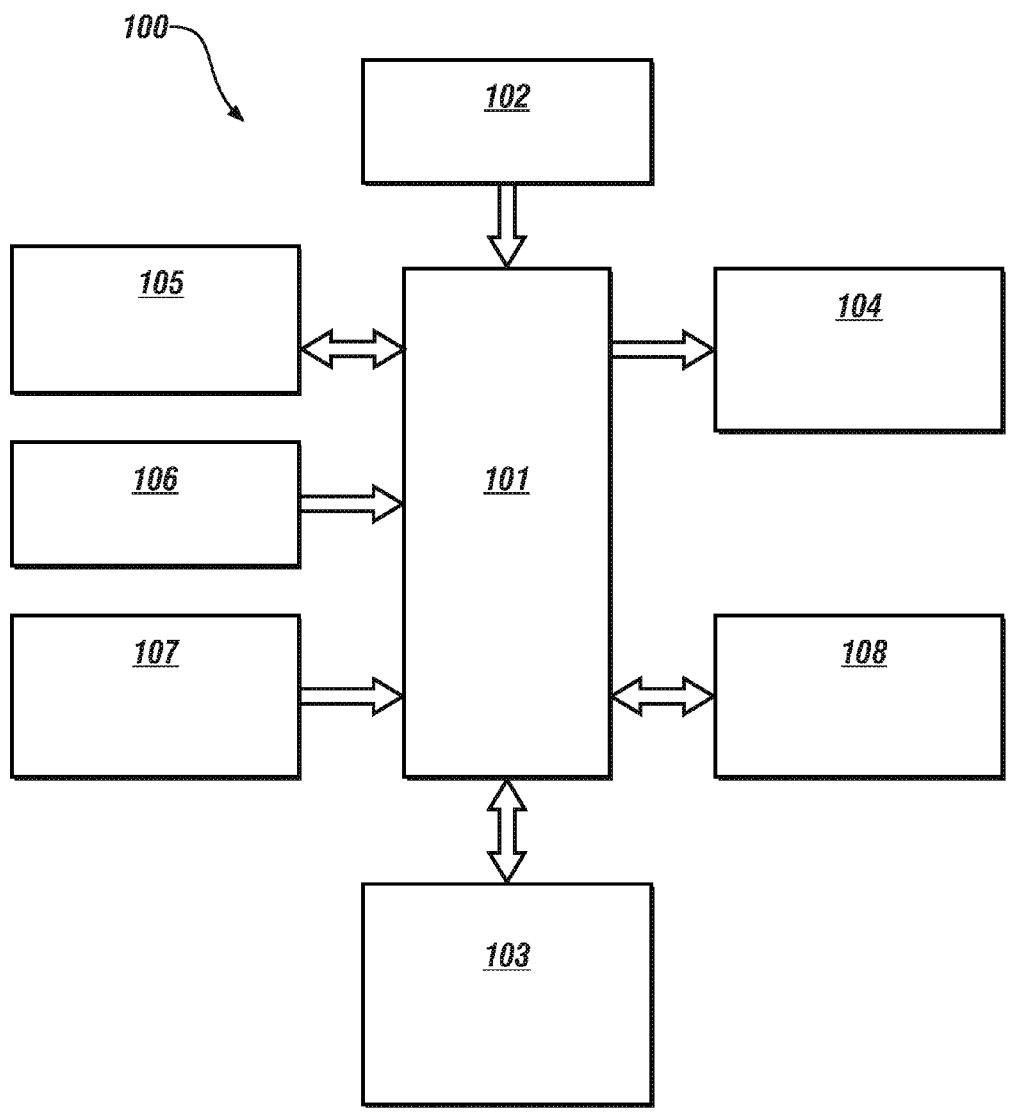
FIG. 1 shows a block diagram of an apparatus that detects a size of a person outside of a vehicle, according to an exemplary embodiment.

An apparatus and method that detect a size of a person or object prior to entering a vehicle or space outside of the vehicle or space will now be described in detail with reference to FIGS. 1-5 of the accompanying drawings in which like reference numerals refer to like elements throughout.

The following disclosure will enable one skilled in the art to practice the inventive concept. However, the exemplary embodiments disclosed herein are merely exemplary and do not limit the inventive concept to exemplary embodiments described herein. Moreover, descriptions of features or aspects of each exemplary embodiment should typically be considered as available for aspects of other exemplary embodiments.

It is also understood that where it is stated herein that a first element is "connected to," "formed on," or "disposed on" a second element, the first element may be connected directly to, formed directly on or disposed directly on the second element or there may be intervening elements between the first element and the second element, unless it is stated that a first element is "directly" connected to, formed on, or disposed on the second element. In addition, if a first element is configured to "receive" or "send" information from or to a second element, the first element may receive or send the information directly from the second element, receive or send the information via a bus, receive or send the information via a network, or receive or send the information via intermediate elements, unless the first element is indicated to receive or send information "directly" from or to the second element.

Throughout the disclosure, one or more of the elements disclosed may be combined into a single device or combined into one or more devices. In addition, individual elements may be provided on separate devices.

Detecting the size of a person, object or occupant enables controls, mirrors, sensors to be adjusted for the convenience of the person, object or occupant as well as to better interact with the person. For example, size detection may be performed inside of a vehicle or space after a person enters the vehicle or space in order to adjust the position of elements such as a steering wheel, seat, mirror, etc., so that they vehicle may be more conveniently and/or comfortably operated. However, entering a vehicle or space with elements that are not optimally positioned prior to adjustment may difficult and uncomfortable.

Detecting the size of a person or object prior to the person or object entering a vehicle or space outside of the vehicle or space may also be performed. After the size of the person or object is detected, the position of elements such as a steering wheel, seat, mirror, controls, sensors, etc., may be adjusted prior to the person entering the space or the vehicle so that they are optimally positioned. This allows for objects or persons to better fit into spaces, more comfortable entry and convenience, and reduces time between entry into the vehicle or space and performing operations on the controls or elements of the vehicle or space. Moreover, adjusting the position of elements such as a steering wheel, seat, mirror, sensors, etc., prior to a user entering the vehicle or space may be performed with respect to rental vehicles and autonomous vehicles such as autonomous taxis, thereby increasing user convenience. The height detection can be sensed based on entry point into the vehicle, thus optimizing seating for each person taking into account whether or not there are adjustments available for ergonomics for a particular seating position.

FIG. 1 shows a block diagram of an apparatus for detecting a size of a person outside of a vehicle 100, according to an exemplary embodiment. As shown in FIG. 1, the apparatus for detecting a size of a person outside of a vehicle 100, according to an exemplary embodiment, includes a controller 101, a power supply 102, a storage 103, an output 104, a vehicle seat and control adjustor 105, a user input 106, an exterior size sensor 107, and a communication device 108. However, the apparatus for detecting a size of a person outside of a vehicle 100 is not limited to the aforementioned configuration and may be configured to include additional elements and/or omit one or more of the aforementioned elements.

The controller 101 controls the overall operation and function of the apparatus for detecting a size of a person outside of a vehicle 100. The controller 101 may control one or more of a storage 103, an output 104, a vehicle seat and control adjustor 105, a user input 106, an exterior size sensor 107, and a communication device 108 of the apparatus for detecting a size of a person outside of a vehicle 100. The controller 101 may include one or more from among a processor, a microprocessor, a central processing unit (CPU), a graphics processor, Application Specific Integrated Circuits (ASICs), Field-Programmable Gate Arrays (FPGAs), state machines, and a combination of hardware, software and firmware components.

The controller 101 is configured to send and/or receive information from one or more of the storage 103, the output 104, the vehicle seat and control adjustor 105, the user input 106, the exterior size sensor 107, and the communication device 108 of the apparatus for detecting a size of a person outside of a vehicle 100. The information may be sent and received via a bus or network, or may be directly read or written to/from one or more of the storage 103, the output 104, the vehicle seat and control adjustor 105, the user input 106, the exterior size sensor 107, and the communication device 108 of the apparatus for detecting a size of a person outside of a vehicle 100.

The power supply 102 provides power to one or more of the controller 101, the storage 103, the output 104, the vehicle seat and control adjustor 105, the user input 106, the exterior size sensor 107, and the communication device 108 of the apparatus for detecting a size of a person outside of a vehicle 100. The power supply 102 may include one or more from among a battery, an outlet, a capacitor, a solar energy cell, a generator, a wind energy device, an alternator, etc.

The storage 103 is configured for storing information and retrieving information used by the apparatus for detecting a size of a person outside of a vehicle 100. The storage 103 may be controlled by the controller 101 to store and retrieve lookup table information comprising a size of a person and positions of various elements such as mirrors, controls, and seats corresponding to the size of the person. The storage 103 may also include the computer instructions configured to be executed by a processor to perform the functions of the apparatus for detecting a size of a person outside of a vehicle 100.

The storage 103 may include one or more from among floppy diskettes, optical disks, CD-ROMs (Compact Disc-Read Only Memories), magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, cache memory, and other type of media/machine-readable medium suitable for storing machine-executable instructions.

The output 104 outputs information in one or more forms including: visual, audible and/or haptic form. The output 104 may be controlled by the controller 101 to provide outputs to the user of the apparatus for detecting a size of a person outside of a vehicle 100. The output 104 may include one or more from among a speaker, a centrally-located a display, a head up display, a windshield display, a haptic feedback device, a vibration device, a tactile feedback device, a tap-feedback device, a holographic display, an instrument light, an indicator light, etc.

The output 104 may output notification including one or more from among an audible notification, a light notification, and a display notification. The notification may include information regarding a position of one or more from among a mirror, a control, and a seat. The output 104 may also display controls for adjusting the position of one or more from among a mirror, a control, and a seat.

The vehicle seat and control adjustor 105 is configured to include one or more from among a motor, a hydraulic, an actuator, gears, etc., to adjust one or more from among a mirror, a control, a sensor, and a seat. For example, the vehicle seat and control adjustor 105 may adjust a position of one or more from among a side view mirror, a rear view mirror, a sensor, a seat, a seat back, a steering wheel, and a vehicle height, etc., based on control information received from the controller 101.

The user input 106 is configured to provide information and commands to the apparatus for detecting a size of a person outside of a vehicle 100. The user input 106 may be used to provide user inputs, etc. to the controller 101. The user input 106 may include one or more from among a touchscreen, a keyboard, a soft keypad, a button, a motion detector, a voice input detector, a microphone, a camera, a trackpad, a mouse, a touchpad, etc. The user input 106 may be configured to receive a user input to acknowledge or dismiss the notification output by the output 104. The user input 106 may also be configured to receive a user input to cycle through notifications or different screens of a notification. Moreover, the user input 106 may also be configured to receive user input to adjust the position of one or more from among a side view mirror, a rear view mirror, a seat, a seat back, a steering wheel, and a vehicle height, etc.

The exterior size sensor 107 is configured to detect a size of a person or object approaching a vehicle or space. The exterior size sensor 107 may include one or more from among a camera, a laser sensor, an ultrasonic sensor, a radiation sensor, dual cameras, etc. For example, the exterior size sensor may detect dimensions (e.g., height, width, depth) or volume of an object or person approaching a space or vehicle.

The communication device 108 may be used by apparatus for detecting a size of a person outside of a vehicle 100 to communicate with various types of external apparatuses according to various communication methods. The communication device 108 may be used to send or receive size information such as dimensions (e.g., height, width, depth) or volume of an object or person approaching a space or vehicle and/or position information such include one or more from among the position of elements such as a steering wheel, seat, mirror, etc. The communication device 108 may also be configured to send or receive the position information and the size information to/from a device such as mobile phone, smart watch, laptop, tablet, or another vehicle, etc. The size information and/or position information may be adjusted by the device. Moreover, the size information and/or the position information may be used by the device to adjust a position of elements such as a steering wheel, seat, mirror, sensors, etc.

The communication device 108 may include various communication modules such as one or more from among a broadcast receiving module, a near field communication (NFC) module, a GPS receiver, a wired communication module, or a wireless communication module. The broadcast receiving module may include a terrestrial broadcast receiving module including an antenna to receive a terrestrial broadcast signal, a demodulator, and an equalizer, etc. The NFC module is a module that communicates with an external apparatus located at a nearby distance according to an NFC method. The GPS receiver is a module that receives a GPS signal from a GPS satellite and detects a current location. The wired communication module may be a module that receives information over a wired network such as a local area network, a controller area network (CAN), or an external network. The wireless communication module is a module that is connected to an external network by using a wireless communication protocol such as Wi-Fi or IEEE communication protocol and communicates with the external network. The wireless communication module may further include a mobile communication module that accesses a mobile communication network and performs communication according to various mobile communication standards such as $3^{rd}$ generation (3G), $3^{rd}$ generation partnership project (3GPP), long term evolution (LTE), Bluetooth, or ZigBee.

The communication device 108 may communicate with a key fob, mobile phone, or other portable device that is configured to perform one or more from among unlocking the vehicle, activating the vehicle, signaling a presence of a person approaching the vehicle, and providing a size of the person approaching the vehicle.

According to an exemplary embodiment, the controller 101 of the apparatus for detecting a size of a person outside of a vehicle 100 is configured to detect, at an exterior of a vehicle, a size of a person approaching the vehicle to enter the vehicle, and control to adjust a position of at least one from among a vehicle control, a vehicle mirror, and a vehicle seat based on the detected size of the person approaching the vehicle.

According to an exemplary embodiment, the controller 101 may control to detect, at an exterior of a space, a size of an object approaching the space to enter the space. The controller 101 may then control to adjust a position of at least one from among a control, a mirror, and a seat based on the detected size of the object approaching the space.

According to another exemplary embodiment, the controller 101 of the apparatus for detecting a size of a person outside of a vehicle 100 may be configured to detect the size of the person in response to detecting that at least one foot of the person is touching ground.

The controller 101 may determine whether the person approaching the vehicle intends to enter the vehicle based on a trajectory of a movement of the person; and detect the size of the person in response to determining that the person approaching the vehicle intends to enter the vehicle. The controller 101 may determine whether the person approaching the vehicle intends to enter the vehicle based on whether the person has key fob corresponding to the vehicle; and detect the size of the person in response to determining that the person approaching the vehicle intends to enter the vehicle. The key fob may be a configured to unlock the vehicle and activate the vehicle.

The controller 101 may control the vehicle seat and control adjustor 105 to adjust a height of a steering wheel based on the detected size of the person approaching the vehicle. In addition, the controller 101 may control the vehicle seat and control adjustor 105 to adjust at least one from among an angle of a rearview mirror and an angle of a side view mirror, based on the detected size of the person approaching the vehicle. Moreover, the controller 101 may control the vehicle seat and control adjustor 105 to adjust at least one from among a height of a seat and a tilt of a seat back, based on the detected size of the person approaching the vehicle.

Figure 2:
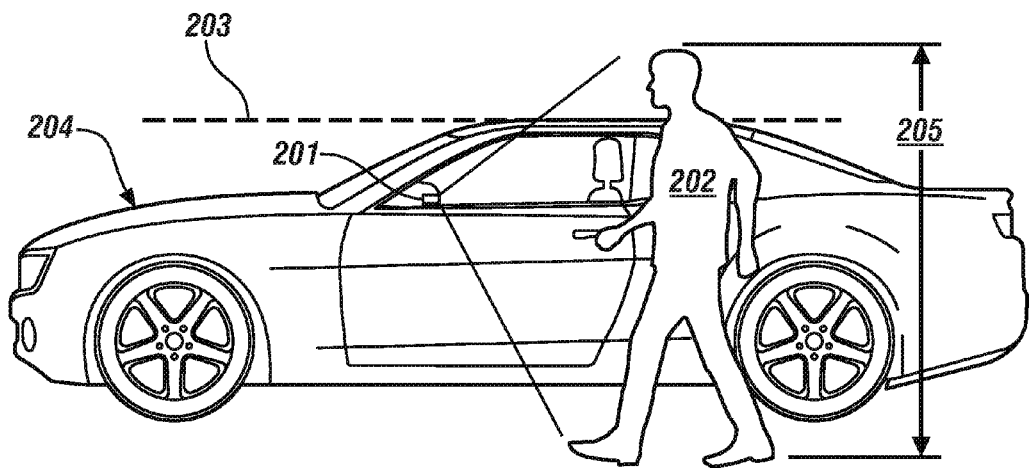
FIG. 2 shows an illustration of detecting a size of a person outside of a vehicle, according to an aspect of an exemplary embodiment.

FIG. 2 shows an illustration of detecting a size 205 of a person 202 outside of a vehicle 204, according to an aspect of an exemplary embodiment. As shown in FIG. 2, an apparatus for detecting a size of a person outside of a vehicle 100 measures the size 205 of person 202 using a camera sensor 201. The size 205 is measured by comparing the value of the size 205 to a reference value 203. In this example, the reference value 203 is the height of the roof of the vehicle 204. The difference between the detected size of the person and a reference value is determined and it is summed with the reference value 203 to determine a size 205 of person 202.

Figure 3:
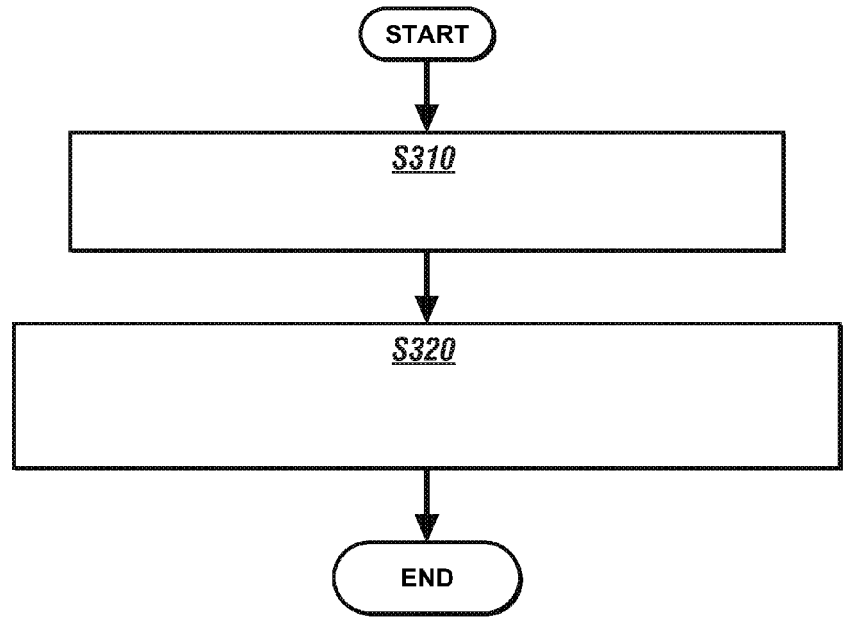
FIG. 3 shows a flowchart for a method of detecting a size of a person outside of a space, according to an aspect of an exemplary embodiment.

FIG. 3 shows a flowchart for a method of detecting a size of a person outside of a space, according to an aspect of an exemplary embodiment. The method of FIG. 3 may be performed by the apparatus for detecting a size of a person outside of a vehicle 100 or may be encoded into a computer readable medium as instructions that are executable by a computer to perform the method.

Referring to FIG. 3, the size of a person approaching the vehicle is detected at the exterior of the vehicle in operation S310. Based on the detected size of the person approaching the vehicle, a position of at least one from among a vehicle control, a vehicle mirror, and a vehicle seat is adjusted in operation S320.

Figure 4:
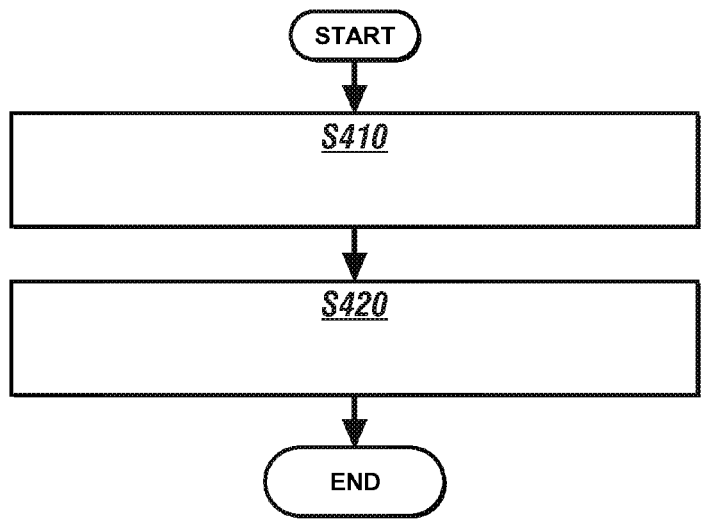
FIG. 4 shows a flowchart for a method of detecting a size of a person outside of a space, according to an aspect of an exemplary embodiment.

FIG. 4 shows a flowchart for a method of detecting a size of a person outside of a space, according to an aspect of an exemplary embodiment. The method of FIG. 4 may be performed by the apparatus for detecting a size of a person outside of a vehicle 100 or may be encoded into a computer readable medium as instructions that are executable by a computer to perform the method.

Referring to FIG. 4, the detected size of the person is a detected height. Moreover, the difference between the detected height of the person and a reference position is determined in operation 410. The difference between the detected height and the reference position is summed with the reference height of the reference position to detect the size of the person in operation S420.

Figure 5:
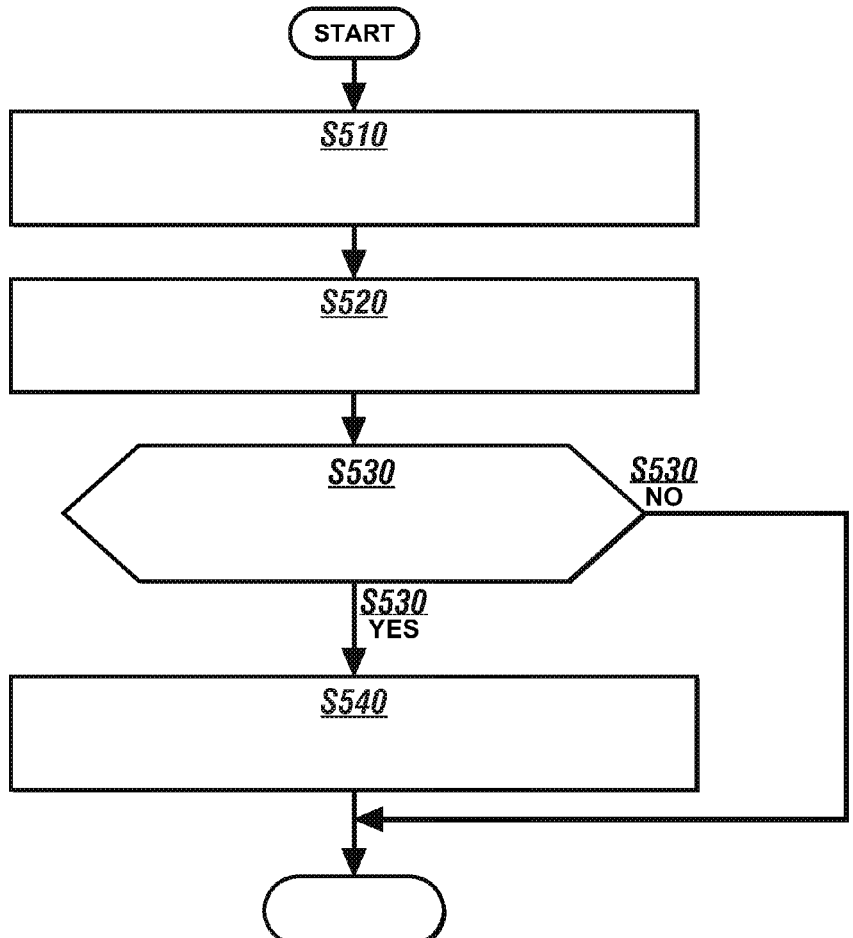
FIG. 5 shows a flowchart for a method of adjusting a position based on the detected size of the person, according to an aspect of an exemplary embodiment.

FIG. 5 shows a flowchart for a method of adjusting a position based on the detected size of the person, according to an aspect of an exemplary embodiment. The method of FIG. 5 may be performed by the apparatus for detecting a size of a person outside of a vehicle 100 or may be encoded into a computer readable medium as instructions that are executable by a computer to perform the method.

Referring to FIG. 5, a preferred position of an element (e.g., a vehicle control, a vehicle mirror, a vehicle seat, etc.) is retrieved from a lookup table based on the determined size of the person in operation S510. In operation S520, a difference between the preferred position and the current position of the element is determined. If the difference between the preferred position and the current position is greater than or equal to a predetermined threshold (operation S530-YES), the position of the element is adjusted to the preferred position (operation S540). If the difference between the preferred position and the current position is less than the predetermined threshold (operation S530-NO), the position of the element is not adjusted.

The preferred position of the element may be a range of preferred element positions corresponding to the determined size of the person. The adjusted position of the element may be adjusted to the closest preferred position to the current position from among the range of preferred positions. In this regard, the lookup table may include a statistical spread of preferred positions corresponding to a detected size of a person. In this case, the element would be adjusted so as to travel the least distance to get to the closest or most favorable of the preferred positions. For example, if the range of element positions is from 0 to 10 and the preferred position is determined to be 6 with tolerance or spread of +/−0.5, and if the element is at position 10, the element would move until a position of 6.5 because that is within +/−0.5 of position 6. Moreover if the element is at position 3, the element would move to position 5.5 because that is within +/−0.5 of position 6. This would allow for the element to be set to the preferred position in the least amount of time.

The processes, methods, or algorithms disclosed herein can be deliverable to/implemented by a processing device, controller, or computer, which can include any existing programmable electronic control device or dedicated electronic control device. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

One or more exemplary embodiments have been described above with reference to the drawings. The exemplary embodiments described above should be considered in a descriptive sense only and not for purposes of limitation. Moreover, the exemplary embodiments may be modified without departing from the spirit and scope of the inventive concept, which is defined by the following claims.

What is claimed is:

1. A method for detecting a size of a person outside of a vehicle, the method comprising:
   determining whether the person approaching the vehicle intends to enter the vehicle based on a trajectory of a movement of the person;
   in response to detecting that at least one foot of the person is touching ground and determining that the person approaching the vehicle intends to enter the vehicle, detecting, at an exterior of the vehicle, a size of a person approaching the vehicle to enter the vehicle; and
   adjusting a position of a vehicle element including at least one from among a vehicle control, a vehicle mirror, and a vehicle seat based on the detected size of the person approaching the vehicle,
   wherein the adjusting the position comprises retrieving a preferred position of the vehicle element from a lookup table based on the detected size of the person, determining a difference between the preferred position and a current position of the vehicle element, and adjusting the position if the difference between the preferred position and the current position is greater than or equal to a predetermined threshold.

2. The method of claim 1, wherein the detected size comprises a height, and
   wherein the detecting the size of the person comprises determining a difference between the height of the person and a reference position, and summing the difference and a reference value of the reference position to detect the height of the person.

3. The method of claim 1, wherein the adjusting the position comprises adjusting at least one from among an angle of a rearview mirror, an angle of a side view mirror, and height of a steering wheel, based on the detected size of the person approaching the vehicle.

4. The method of claim 1, wherein the detecting, at the exterior of the vehicle, the size of the person approaching the vehicle to enter the vehicle comprises receiving an input of a size of the person from the person approaching the vehicle.

5. The method of claim 1, wherein the adjusting the position comprises adjusting at least one from among a seat track position, a height of a seat, and a tilt of a seat back, based on the detected size of the person approaching the vehicle.

6. The method of claim 1, wherein the detecting the size of the person approaching the vehicle is performed based on information received from a sensor sensing the exterior of the vehicle.

7. The method of claim 6, wherein the sensor comprises a plurality of cameras.

8. The method of claim 1, wherein the person approaching the vehicle comprises a plurality of people including a front seat occupant and a rear seat occupant, and
   wherein the adjusting the position comprises adjusting the position of a front seat based on the detected size of the front seat occupant and the detected size of the rear seat occupant.

9. An apparatus for detecting size of a person approaching a vehicle, the apparatus comprising:
   at least one memory comprising computer executable instructions; and
   at least one processor configured to read and execute the computer executable instructions, the computer executable instructions causing the at least one processor to:
   determine whether the person approaching the vehicle intends to enter the vehicle based on a trajectory of a movement of the person;
   in response to detecting that at least one foot of the person is touching ground and determining that the person approaching the vehicle intends to enter the vehicle, detect, at an exterior of the vehicle, a size of a person approaching the vehicle to enter the vehicle; and
   adjust a position of a vehicle element including at least one from among a vehicle control, a vehicle mirror, and a vehicle seat based on the detected size of the person approaching the vehicle,
   wherein the computer executable instructions causing the at least one processor to adjust the position comprises retrieving a preferred position of the vehicle element from a lookup table and a current position of the vehicle element, and adjusting the position if the difference between the preferred position and the current position is greater than or equal to a predetermined threshold.

10. The apparatus of claim 9, wherein the detected size comprises a height, and
    wherein the computer executable instructions further cause the at least one processor to detect the height of the person by determining a difference between the detected height of the person and a reference position and summing the difference and a reference value of the reference position to detect the height of the person.

11. The apparatus of claim 9, wherein the computer executable instructions further cause the at least one processor to adjust the position by adjusting at least one from among an angle of a rearview mirror, an angle of a side view mirror, and height of a steering wheel, based on the detected size of the person approaching the vehicle.

12. The apparatus of claim 9, wherein the computer executable instructions further cause the at least one processor to detect, at the exterior of the vehicle, the size of the person approaching the vehicle to enter the vehicle by receiving an input of a size of the person from the person approaching the vehicle.

13. The apparatus of claim 9, wherein the computer executable instructions further cause the at least one processor to adjust the position by adjusting at least one from among a seat track position, a height of a seat, and a tilt of a seat back, based on the detected size of the person approaching the vehicle.

14. The apparatus of claim 9, wherein the computer executable instructions further cause the at least one processor to detect the size of the person approaching the vehicle based on information received from a sensor sensing the exterior of the vehicle.

15. The apparatus of claim 14, wherein the sensor comprises a plurality of cameras.

16. A non-transitory computer readable medium comprising computer executable instructions executable by a processor to perform a method for detecting a size of an object approaching a space, the method comprising:
    determining whether an object approaching a space will enter the space based on a trajectory of a movement of the object,
    in response to determining that the object approaching the space will enter the space, detecting, at an exterior of the space, a size of the object approaching the space to enter the space; and
    adjusting a position of an element including at least one from among a control, a mirror, a sensor, and a seat based on the detected size of the object approaching the space, wherein the adjusting the position comprises retrieving a preferred position of the element from a lookup table based on the detected size of the object, determining a difference between the preferred position and a current position of the element, and adjusting the position if the difference between the preferred position and the current position is greater than or equal to a predetermined threshold.

* * * * *